(12) United States Patent
Onishi et al.

(10) Patent No.: US 6,196,629 B1
(45) Date of Patent: Mar. 6, 2001

(54) VEHICULAR CHILD SAFETY SEAT

(75) Inventors: Ichiro Onishi; Toshiyuki Imamichi, both of Osaka (JP)

(73) Assignee: Aprica Kassai Kabushikikaisha, Osaka (JP)

( * ) Notice: Subject to any disclaimer, the term of this patent is extended or adjusted under 35 U.S.C. 154(b) by 0 days.

(21) Appl. No.: 09/004,699

(22) Filed: Jan. 8, 1998

(30) Foreign Application Priority Data

Jan. 8, 1997 (JP) .................................................... 9-001170
Oct. 22, 1997 (JP) .................................................... 9-289733

(51) Int. Cl.$^7$ ...................................................... B60N 2/28
(52) U.S. Cl. ................................ 297/256.12; 297/256.13; 297/354.13
(58) Field of Search ......................... 297/256.12, 256.13, 297/250.1, 354.13, 184.13

(56) References Cited

U.S. PATENT DOCUMENTS

| | | |
|---|---|---|
| 4,205,877 | 6/1980 | Ettridge . |
| 4,274,674 * | 6/1981 | Deloustal ........................ 297/256.13 |
| 4,762,364 | 8/1988 | Young . |
| 4,936,629 * | 6/1990 | Young ............................. 297/256.12 |
| 4,998,307 * | 3/1991 | Cone ................................ 297/256.13 |
| 5,183,312 * | 2/1993 | Nania .............................. 297/256.12 |
| 5,496,092 * | 3/1996 | Williams et al. ................ 297/256.13 |
| 5,681,084 * | 10/1997 | Yoneda ........................... 297/354.13 |

FOREIGN PATENT DOCUMENTS

| | | | |
|---|---|---|---|
| 4137599 * | 5/1993 | (DE) | ................................ 297/256.13 |
| 0009439 | 4/1980 | (EP) . | |
| 0326265 | 8/1989 | (EP) . | |
| 0426585 | 5/1991 | (EP) . | |
| 545185 * | 6/1993 | (EP) | ................................ 297/256.13 |
| 2256364 | 12/1992 | (GB) . | |
| 62-43835 | 3/1987 | (JP) . | |
| 1-113007 | 5/1989 | (JP) . | |
| 1-90654 | 6/1989 | (JP) . | |
| 7-017312 | 1/1995 | (JP) . | |
| 91/00193 | 1/1991 | (WO) . | |

OTHER PUBLICATIONS

Japanese Industrial Standard (JIS), Automotive accessories—Child restraints, JIS D 0401–1996.

* cited by examiner

Primary Examiner—Anthony D. Barfield
(74) Attorney, Agent, or Firm—W. F. Fasse; W. G. Fasse

(57) ABSTRACT

A vehicular child safety seat includes a seat main body (1A) attached to a base body (1C) in a rotatable manner. The seat main body includes a seat portion (16), a backrest (11) reclinably hinged to the seat portion, a head guard (10) tiltably hinged to the upper edge of the backrest, side guards (12, 13) protruding perpendicularly from lateral edges of the backrest, and armrests (14, 15) protruding upwardly along side edges of the seat portion. When the backrest is in its most reclined position, and the seat main body is rotated on the base body to be transverse to the longitudinal direction of the vehicle, the seat portion and backrest are substantially coplanar and horizontal to form a baby bed. When the backrest is in a more upright position, and the seat main body is rotated to face forward or rearward in the vehicle, the safety seat is suitable for an infant, toddler or older child sitting upright. Thus, a vehicular child safety seat can be provided that can be used constantly throughout the entire childhood for a baby, an infant, and a child of school age.

19 Claims, 17 Drawing Sheets

VEHICULAR CHILD SAFETY SEAT

CROSS-REFERENCE TO RELATED APPLICATION

This application is related to copending U.S. application Ser. No. 09/238,265, having the same Assignee as the present application.

BACKGROUND OF THE INVENTION

1. Field of the Invention

The present invention relates to a vehicular child safety seat placed on a seat of a vehicle and fastened to the seat of the vehicle using a seat belt with which the vehicle is equipped.

2. Description of the Background Art

In recent years safety measures have emerged as a critical factor for vehicles, and various vehicular child safety seats have been developed as a device for insuring the safety of a new-born baby, a baby, an infant, and a child of school age (referred to generically as "child" hereinafter) riding in a vehicle.

The Japanese Industrial Standard has established detailed standards in "Vehicle Equipment-Child Protection Device: JIS-D 0401-1996" with respect to a vehicular child safety seat.

According to the Japanese Industrial Standard, the type of a child protection device or child restraint is classified into "baby (including new-born baby) bed", "infant seat (for both forward and rear facing directions)" and "child seat". The classification is divided according to the weight range of the child, i.e., W1 (less than 10 kg), W2 (at least 9 kg and less than 18 kg), W3 (at least 15 kg and not more than 25 kg), and W4 (at least 22 kg and not more than 36 kg). In order to satisfy the safety requirements for the classes of W1 and W2, an infant seat, when used in a rear facing direction with respect to the direction of travel, must have a mechanism to prevent the tilted angle of the backrest, i.e. the angle of the surface of the backrest relative to the vertical plane, from exceeding the maximum of 60 degrees at the time of a crash accident on account of the rebound of the infant seat.

In general, the child protection apparatus for weight class W1 refers to an apparatus fixed to the seat of a vehicle in a direction lateral or facing rearward with respect to the direction of travel of a vehicle for babies aged 0–10 months. The child protection apparatus for weight class W2 refers to an apparatus fixed to a seat of a vehicle in a frontward or backward facing direction with respect to the direction of travel of the vehicle for infants from 6 months to 3 or 4 years (commercially available as a "child seat" in general). The child protection apparatus for weight class W3 refers to an apparatus for elevating the seat bottom plane for a child aged 3 or 4 years to 6 years (commercially available as a "booster" in general).

Various products have been developed as devices to be applied to vehicular child protection apparatuses for weight W1, W2 and W3.

The rate of usage of child protection apparatuses in vehicles in the Japanese society is extremely lower than that compared to US and European countries. The first factor can be ascribed to the lack of the parents in recognizing the danger associated with vehicles. Furthermore, if a child shows his/her reluctance in being seated in the child protection apparatus, there is a possibility that the child protection apparatus will not be used. These all come from the lack of danger appreciated by adults associated with vehicles.

In view of the foregoing, it is first necessary to reform the recognition of adults as to the danger associated with automobiles. Aggressive official activities by the government are expected. The problem of a child showing reluctance to use a child protection apparatus can be obviated more or less by always having a child seated in the child protection apparatus ever since his/her babyhood, i.e. before a baby begins to take notice, so that the child will take it for granted that a child protection apparatus must be used when riding in a car.

This is extremely important from the social point of view. Thus, a child protection apparatus that can be used consistently from babyhood to school age is desired in order to inculcate the habit and recognition of always using a child protection apparatus for children riding in a car. In other words, a child protection apparatus is desired that commonly corresponds to the specification of all the above-described weight classes W1 to W3.

However, child protection apparatuses currently available on the market are only solitary products for a respective single weight class W1, W2, or W3 independently, or a product that has a rotatable seat and a reclinable backrest as disclosed in Japanese Patent Laying-Open No. 1-113007. There is no product that can be commonly used for weight classes W1 and W2, or for weight classes W1 to W3. Although the vehicle infant restraint seat disclosed in the aforementioned Japanese Patent Laying-Open No. 1-113007 seems to be available for consistent usage for W1 and W2 in common, this seat apparatus is intended for only infants and children. It is not suitable for small babies and infants, particularly those in supine and prone positions. This is because the apparatus, when taking a bed-like flat position by reclining the backrest portion, has its head portion open with inadequate support for babies to be laid on the apparatus. This restraint seat does not have the requirements for weight class W1.

SUMMARY OF THE INVENTION

An object of the present invention is to provide a vehicular child safety seat that can be consistently used for children of various ages from babyhood to childhood.

According to an aspect of the present invention, a vehicular child safety seat is fixed to a seat of a vehicle using a seat belt with which the vehicle is equipped, and has a support plane for supporting a child. The support plane is provided in a selectable manner to be configurable into a first state forming a bed plane enclosing the head and side portions of a child for laying the child transverse to the direction of travel of the vehicle, and a second state forming a seat plane for seating the child facing forward or rearward with respect to the direction of travel of the vehicle.

According to the vehicular child safety seat of the above-described structure, the child can be laid transverse to the direction of travel of the vehicle. Usage corresponding to weight class W1 is allowed by forming a bed plane enclosing the head and side portions of the child. Also, usage for weight class W2 is allowed by forming a seat plane for seating the child facing frontward or rearward to the direction of travel of the vehicle.

Thus, the vehicular child safety seat of the present invention can be used in common from babyhood to childhood.

According to another aspect of the present invention, a vehicular child safety seat is implemented by a seat device including a seat bottom, a backrest arranged to be reclinable with respect to the seat bottom, a pair of side guards extending from both sides of the backrest and substantially perpendicular to the front side surface of the backrest, a head guard attached at the upper end of the backrest in a manner so as to be angularly orientable relative to the front side surface of the backrest.

According to the above structure, the top and sides of the head and the sides of the body of a child can be protected in a safe and comfortable state to improve the safety of the child in a vehicle.

According to a further aspect of the present invention, the above vehicular child safety seat further includes a support device and is a base. The support device includes a pair of arm rests at the inner side and in close proximity to the pair of side guards for supporting the pair of side guards in a backward and frontward rotatable manner about the support point, and a connection plate connecting the lower ends of the pair of arm rests. The base includes a holding device for holding the support device in a rotatable manner to allow rotation in a substantially horizontal direction, i.e. on a substantially horizontal rotation plane.

According to the above structure, the sides of the body of the child can be protected sufficiently. Also, by the reclinable backrest and the support device rotatable with respect to the base, the support device can be oriented in a direction transverse, forward, or rearward with respect to the direction of travel of the vehicle.

In the above vehicular child safety seat, the seat device is detachable from the base. By this structure, the vehicular child safety seat can be used for weight class W3.

In the above vehicular child safety seat, the holding device preferably includes a circular convex portion provided at the base, a through opening provided in the connection plate for receiving the convex portion, and a support plate sandwiching the connection plate with the base and secured to the convex portion so that the connection plate is rotatable.

By making the support device rotatable with respect to the base, the support device can be implemented in a more preferable form in the transverse, forward or backward direction with respect to the direction of travel of the vehicle.

In the above vehicular child safety seat, the holding device and the backrest preferably have a backrest inclination limit device provided to allow the backrest to be reclined when the seat device is in a transverse position, and to prevent the backrest from reclining when at positions other than the transverse position of the seat device.

The backrest inclination limit device also embodies a mechanism for preventing the tilted angle of the backrest position, i.e. the angle between the surface of the backrest and the vertical direction, from exceeding the maximum of 60 degrees during a crash accident taking into consideration the rebound of the vehicular child safety seat at the time of collision when the vehicular child safety seat is used as a backward facing infant seat.

In the above vehicular child safety seat, the backrest inclination limit device preferably includes an engagement projection provided in the proximity of the lower end portion of the backrest at the rear side, a concave groove provided at the support plate extending in the lateral direction that can receive the engagement projection so that the backrest can be inclined when the seat device is in the transverse state, and an abutment plane for preventing the reclining of the backrest by abutting against the engagement projection when an attempt is made to recline the backrest in a state other than in the transverse state.

According to the above structure, the space of the vehicular child safety seat can be used effectively. Also, when the vehicular child safety seat is used as a rearward facing infant seat, the mechanism can be realized to prevent the tilted angle of the backrest portion from exceeding the maximum of 60 degrees at the time of a collision taking into consideration the rebound of the vehicular child safety seat.

In the above vehicular child safety seat, the engagement projection is preferably provided so as to be received in the concave groove to prevent the rotation of the seat device relative to the base when the seat device is in a transverse state. According to this structure, rotation of the seat device relative to the base can be prevented when the seat device is in a transverse state used as a bed. Thus, the safety can be improved when the device is used as a bed.

According to still another aspect of the vehicular child safety seat of the present invention, the pair of side guards and the pair of armrests are arranged to have a portion thereof overlapping each other. By this structure, the side of the child can be protected by a double structure of at least the side guard and the armrest. Particularly in the case where the vehicular child safety seat is used as a bed in the transverse state, the safety at the time of a crash accident can be improved.

According to yet a further aspect of the vehicular child safety seat of the present invention, the seat bottom is supported by the pair of armrests so that the seat bottom slides toward the backrest as the backrest is moved upwards. According to this structure, the seat bottom slides backward as the backrest is moved to its upright position correspondingly as the child is transposed to a sitting position from a lying position. Therefore, any drag or pulling of the clothing and the like at the back of the child is eliminated. The child can be moved from a lying position to a sitting position in a natural manner. Preferably, the above vehicular child safety seat further includes a crotch belt passing through an elongated hole provided in the seat portion along the sliding direction of the seat portion and fastened to the connected plate. By this structure, the distance between the backrest and the crotch belt is increased when the seat portion slides backward as the backrest is moved upright since the crotch belt is fastened to the connection plate. When the crotch belt is used as a 5 point seat belt together with a pair of shoulder belts and a pair of lumbar belts in a preferable embodiment, the child user will feel no oppressive or uncomfortable sensation even when transposed from a lying position to a sitting position. A comfortable posture can be provided.

In yet another aspect of the vehicular child safety seat of the present invention, the base further includes a seat fixation device for selectively fixing the rotary orientation of the seat device relative to the base. By this structure, the vehicular child safety seat can be secured in a transverse, forward-facing or backward-facing state with respect to the direction of travel of the vehicle.

According to yet another aspect of the vehicular child safety seat of the present invention, a connection device is provided between the pair of armrests and the head guard so that the head guard is oriented substantially perpendicular to the front side surface of the backrest when the backrest is at its most reclined position. By this structure, the head guard will be in an orientation substantially perpendicular to the front side surface of the backrest when the vehicular child safety seat is set to a bed position with the backrest in the most reclined state. The child using the vehicular child safety seat will be enclosed by the head guard, the pair of side guards, and the pair of armrests to be able to be protected at a high safety level.

In the above vehicular child safety seat, the connection device preferably includes a connection bar having one end rotatably connected in the proximity of the lower end of the head guard and another end accepted in a rotatable and slidable manner in an elongated guide aperture provided in the armrest. The elongated guide aperture includes a first elongated aperture portion provided to gradually approach the support point so that the head guard is oriented substantially perpendicular to the front side surface of the backrest portion when the backrest is at its most reclined position, and a second elongated aperture portion having an arc shape provided continuous to the first elongated aperture portion and on the circumference centered about the support point so that the head guard gradually becomes substantially flush with the backrest as the backrest is moved to its upright position. By this structure, the head guard that is oriented substantially perpendicular to the front side surface of the backrest when in a bed-like state can be gradually rendered coplanar with the backrest, due to the mechanical structure, while the backrest is transitioned from the most reclined state to an upright state.

In another aspect of the vehicular child safety seat of the present invention, the seat device includes a reclining mechanism for selectively altering the tilted angle of the backrest relative to the seat bottom between the position in which the backrest is most reclined with the seat bottom and the backrest substantially in a flat state to form a bed plane on which a child is to be laid, and the position in which the backrest is in the most upright position for the child to take a seating posture. By this structure, the tilted angle of the backrest relative to the seat bottom can be selectively altered to provide a comfortable posture for the child.

Preferably, the reclining mechanism includes at least two engagement holes in the armrest, an engagement pin provided at the inner side of the side guard and biased by a resilient member so as to be inserted into the engagement hole in a normal state, and a release handle provided at the backside of the backrest for releasing the bias applied to the engagement pin by the resilient member. By this structure, the tilted angle of the backrest relative to the seat bottom can be selectively altered in a more preferable manner.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

A vehicular child safety seat according to a first embodiment of the present invention will be described hereinafter with reference to the drawings. First, the structure of a vehicular child safety seat (simply referred to as "child seat" hereinafter) 1 of the first embodiment will be described with reference to FIGS. 1 and 2.

Figure 16:
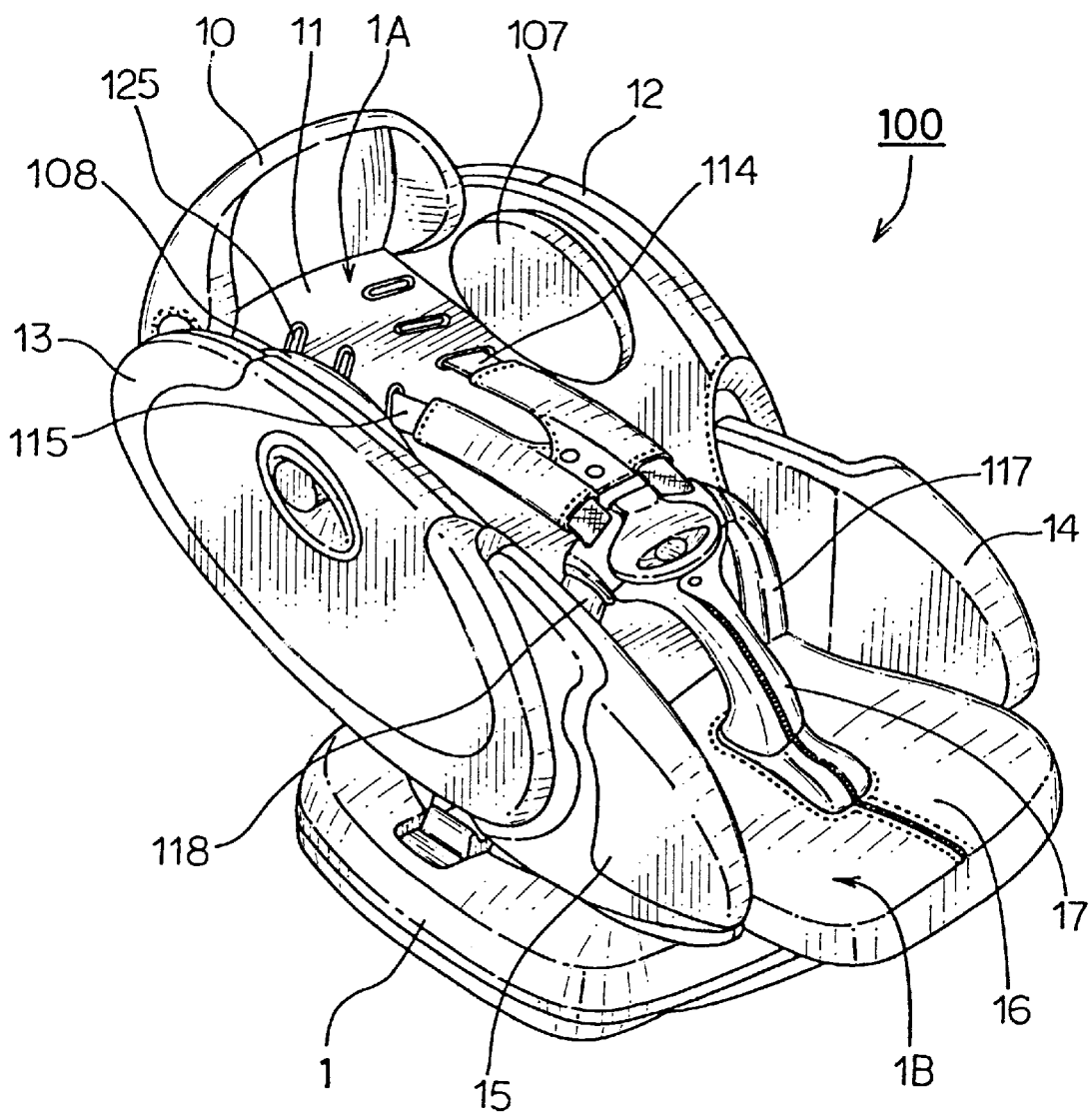
FIGS. 16 and 17 respectively show an entire structure of a child seat according to a second embodiment of the present invention in two different positions.
Figure 17:
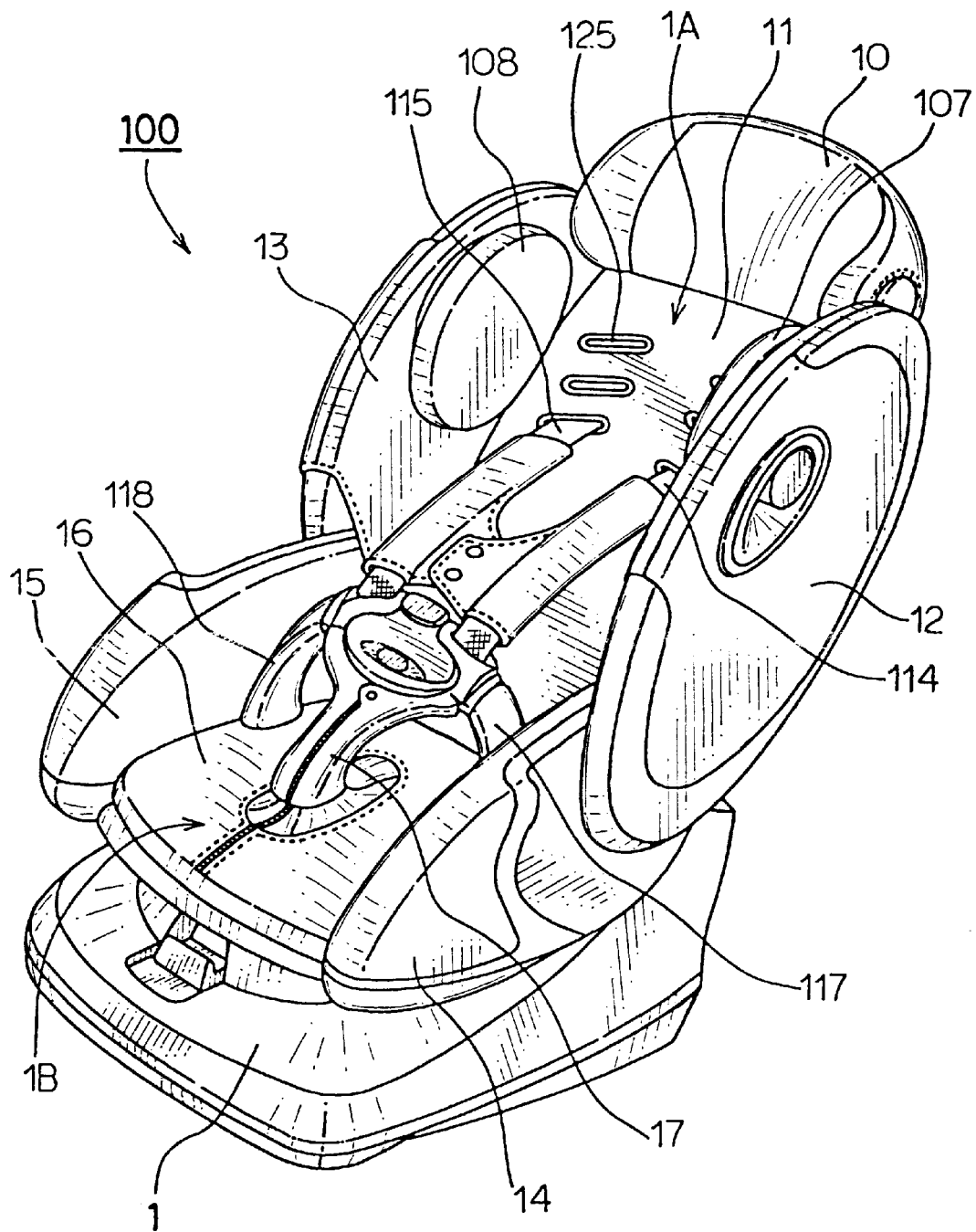

In child seat 1, the surface of the members constituting child seat 1 are generally covered with a cushioning cover, for example urethane foam, to absorb any impact so as to ensure comfort and safety features. However, child seat 1 is illustrated in the drawings without the urethane foam in the present embodiment for better understanding of the structure of child seat 1. A child seat with urethane foam will be described in the subsequent second embodiment (FIGS. 16 and 17).

Figure 1:
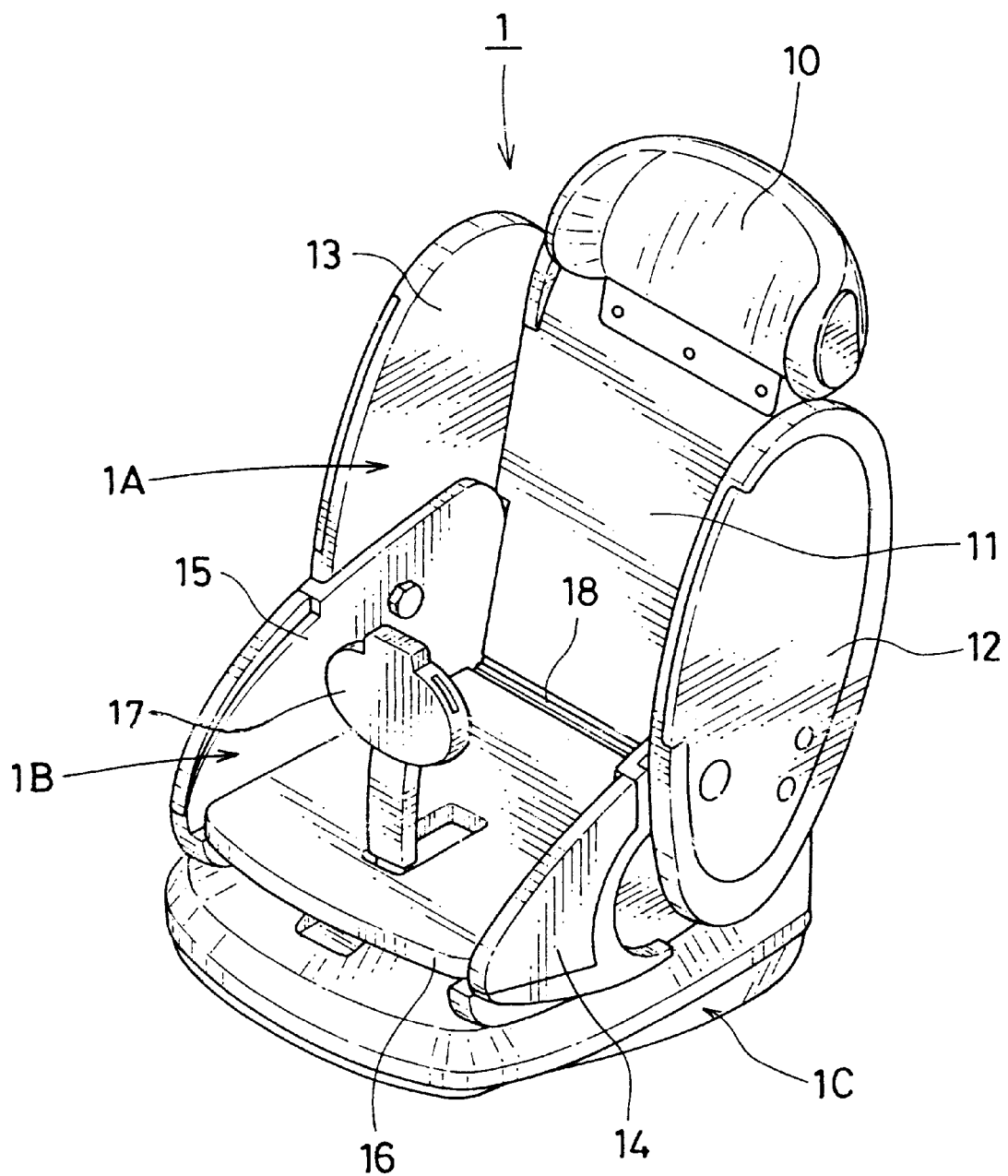
FIG. 1 is a perspective view showing a schematic structure of a child seat according to a first embodiment of the present invention.

Referring to FIG. 1, child seat 1 includes a seat device 1A, a support device 1B, and a base 1C.

Seat device 1A includes a seat bottom 16, and a backrest 11 hingedly connected at the rear end side of seat bottom 16 via a hinge member 18 in a reclinable manner. A pair of side guards 12 and 13 are provided at both sides of backrest 11, extending substantially perpendicular to backrest 11. A head guard 10 is connected to the upper end of backrest 11 via a hinge member 19 in a manner so that the head guard is rotatable forwardly and backwardly to an angular orientation.

Support device 1B includes a pair of armrests 14 and 15 arranged at the inner side and in close proximity to the pair of side guards 12 and 13, and a connection plate 21 (refer to FIG. 2) connecting the lower ends of the pair of armrests 14 and 15. Base 1C maintains support device 1B to be rotatable in the horizontal direction, i.e. on a horizontal rotation plane about a vertical rotation axis by means of a holding device (described subsequently).

Child seat 1 includes a crotch belt 17 that extends from beneath the crotch of the child supported in child seat 1 upward to firmly retain the child. A pair of shoulder belts extending from above both shoulders of the child and a pair of lumbar belts supporting the lumbar portion of the child will be described together with crotch belt 17 in the subsequent second embodiment (FIGS. 16 and 17).

Figure 2:
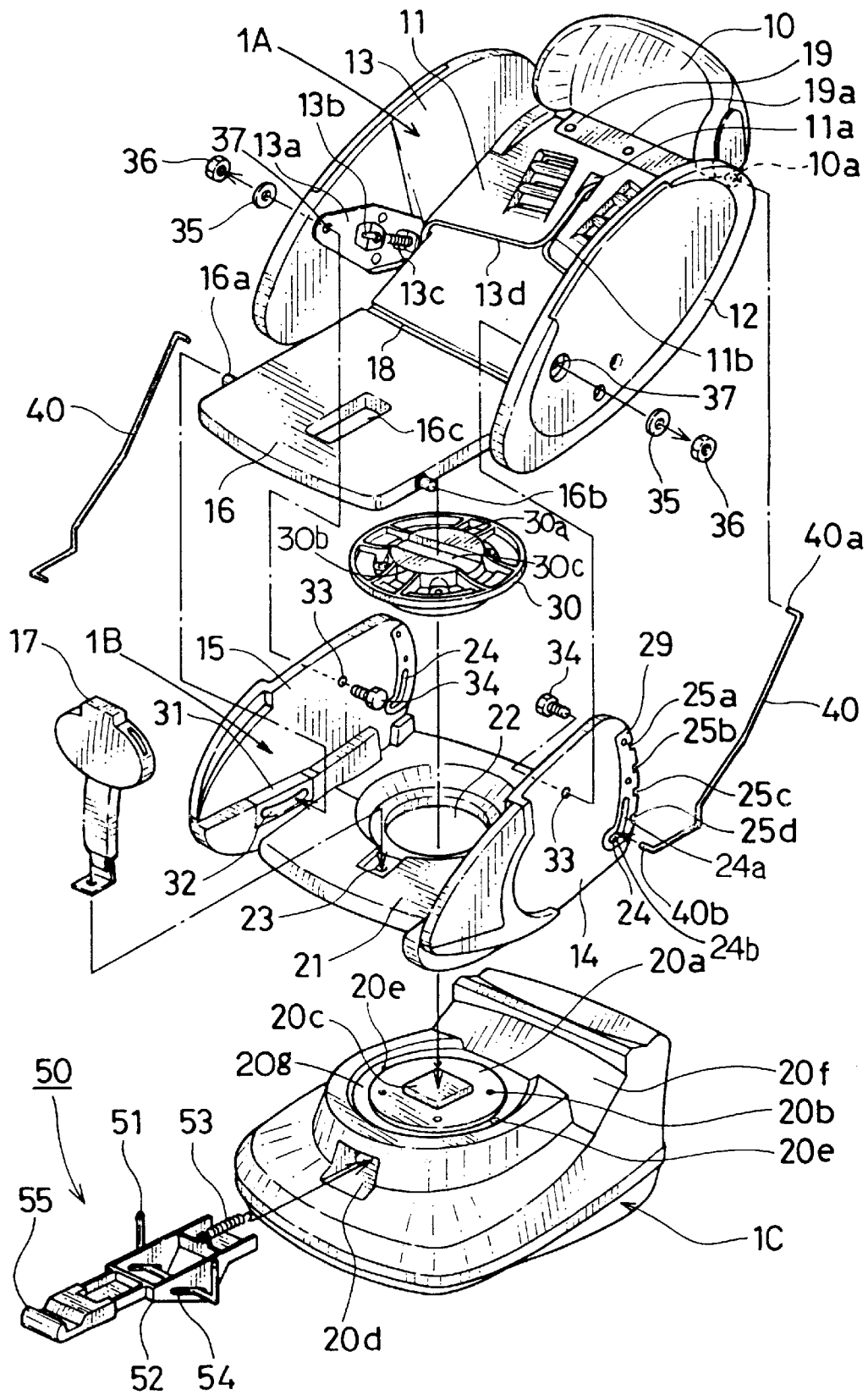
FIG. 2 is an exploded perspective view showing a structure of the child seat according to the first embodiment of the present invention.

The structure of child seat 1 will be described in further detail with reference to FIG. 2.

Seat device 1A and support device 1B are connected by means of a respective pin bolt 34, a respective washer 35 and a respective nut 36 so as to couple bolt holes 33, 33 provided in armrests 14 and 15 as the support points and bolt holes 37, 37 in side guards 12 and 13 functioning as supported points.

The pair of side guards 12 and 13 and the pair of arm rests 14 and 15 are arranged to have respective portions overlap each other at the general region or vicinity of bolt holes 33, 33 and bolt holes 37, 37.

By this structure, the side of a child user will be protected by a double structure of at least side guards 12 and 13 and armrests 14 and 15. The safety of the child seat 1 at the time of a car accident such as a collision or crash when child seat 1 is used as a bed in a transverse position can be improved.

Guide protuberances 16a and 16b are provided at both side faces of seat bottom 16. Protuberances 16a and 16b are attached so as to fit respectively into a guide groove 32 of a block 31 provided at the inward side of armrests 14 and 15. This causes seat bottom 16 to be gradually shifted backward along guide groove 32 when backrest 11 of seat device 1A pivots forward about pin bolt 34.

Crotch belt 17 is attached to a recess 23 provided in connection plate 21 of support device 1B by means of a bolt (not shown) and extends through a through opening 16c in seat bottom 16. By this structure, seat bottom 16 slides backward as backrest 11 is moved to its upright position. However, the space between backrest 11 and crotch belt 17 becomes wider since crotch belt 17 is fixed to connection plate 21. The child will not feel any oppressive or uncomfortably confining sensation even when moved from a lying position to a sitting position where the crotch belt is used in a more preferable manner as a component of a five point seat belt together with the pair of shoulder belts and the pair of lumbar belts (second embodiment: FIGS. 16 and 17). Therefore, the child can maintain a comfortable position.

An engagement pin 13b is attached to a fix plate 13a respectively at the inner side of side guards 12 and 13 to adjust the tilted angle of backrest 11. Engagement pin 13b is biased by a spring 13c so as to always protrude forward. One end of a wire 13d is connected to the trailing end of engagement pin 13b. The other end of wire 13d is threaded through an opening lla in backrest 11 to be connected to a reclining lever 43 (refer to FIG. 6) provided at the backside of backrest 11.

Engagement holes 25a, 25b, 25c and 25d for receiving engagement pin 13b are provided at the trailing end sides of armrests 14 and 15. Engagement holes 25a–25d are provided in a reinforcement plate 29. Reinforcement plate 29 is provided at the trailing end side of armrests 14 and 15.

In the state where engagement pin 13b is fitted in engagement hole 25d, seat bottom 16 and backrest 11 are substantially flush with each other, taking a horizontal flat state to form a bed plane. In the state where engagement pin 13b is fitted into engagement hole 25a, backrest 11 is at its most upright position. The number of four engagement holes provided in the present embodiment is arbitrary. The tilted angle of backrest 11 can be selected arbitrarily according to the number of the engagement holes.

Head guards 10 and the pair of armrests 14 and 15 are connected by a link bar 40 on each side. Link bar 40 has one end connected to a lower end portion 10a of head guard 10 in a rotatable manner, and the other end 40b fitted into an elongated link guide aperture 24 provided at the trailing end side of armrests 14 and in a rotatable and swingable manner.

Head guard 10 is attached at the upper end of backrest 11 and is supported rotatably by a hinge 19a secured to backrest 11 by at least one pin 19.

Elongated link guide aperture 24 includes a first aperture portion 24b that gradually approaches the support point implemented by bolt holes 33, 37 and pin bolt 34 so that head guard 10 is oriented substantially perpendicular to the front side surface of back rest 11 when back rest 11 is at the most reclined position, and an elongated circular second aperture 24a provided on the circumference about the support point and continuous to the first elongated aperture 24b so that head guard 10 becomes substantially coplanar with backrest 11 as backrest 11 is gradually moved to its upright position.

The reclining operation of child seat 1 and the rotatable motion of head guard 10 that cooperate with the reclining operation will be described below.

The mounting of support device 1B that supports seat device 1A onto base 1C will be described hereinafter. An opening 22 is provided substantially at the center portion of connection plate 21 of support device 1B. Support plate 30 is fastened to base 1C through opening 22 by threading in a screw (not shown) into screw holes 20b of base 1C. Here, support plate 30 is positioned by a convex portion 20c provided on fix plate 20a. Support device 1B sandwiched by support plate 30 and base 1C is rotatable in a horizontal plane along a groove 20g provided in base 1C. A seat belt fixation groove 20f for engaging the seat belt with which the vehicle is equipped is provided in base 1C.

Figure 3:
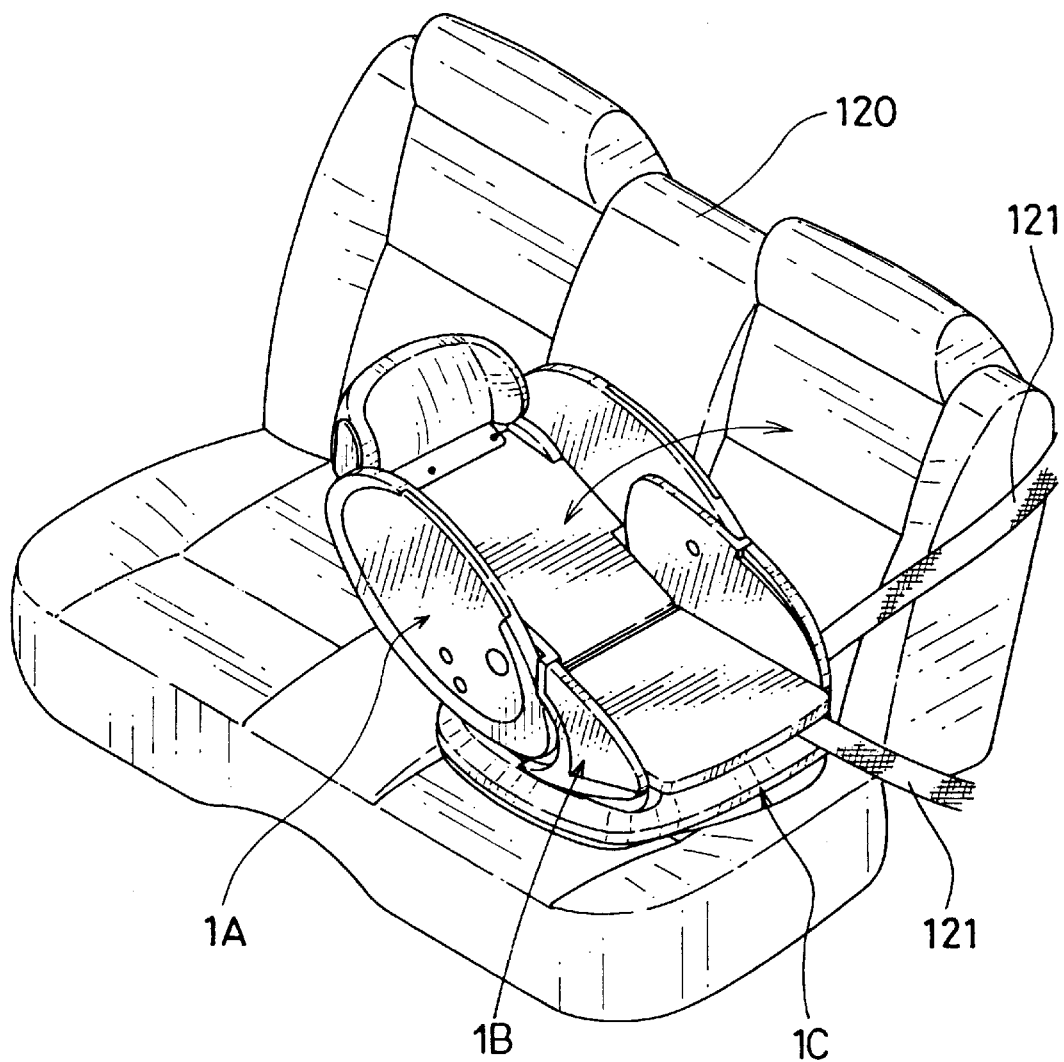
FIGS. 3–5 show respective use positions of the child seat according to the first embodiment of the present invention.
Figure 4:
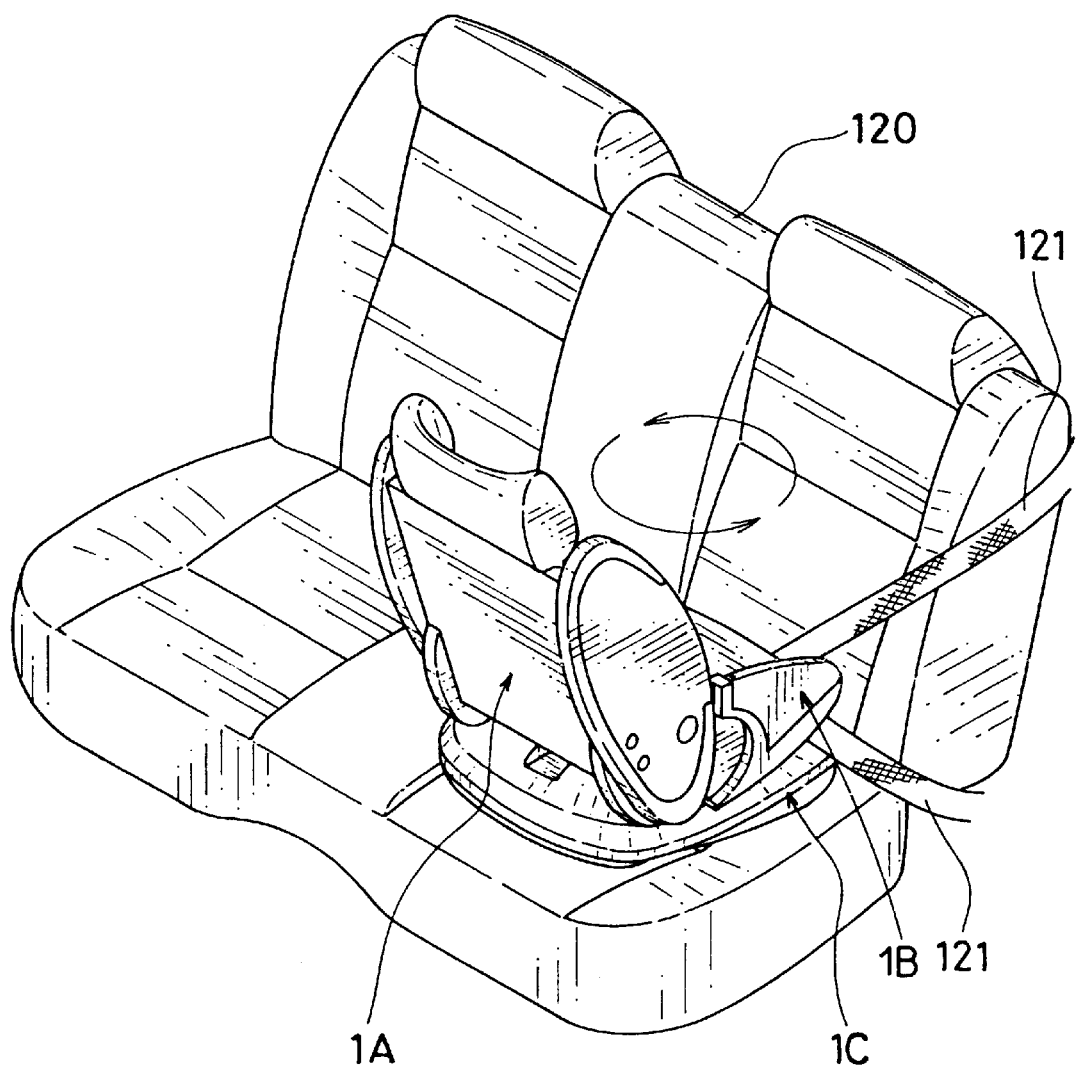
Figure 5:
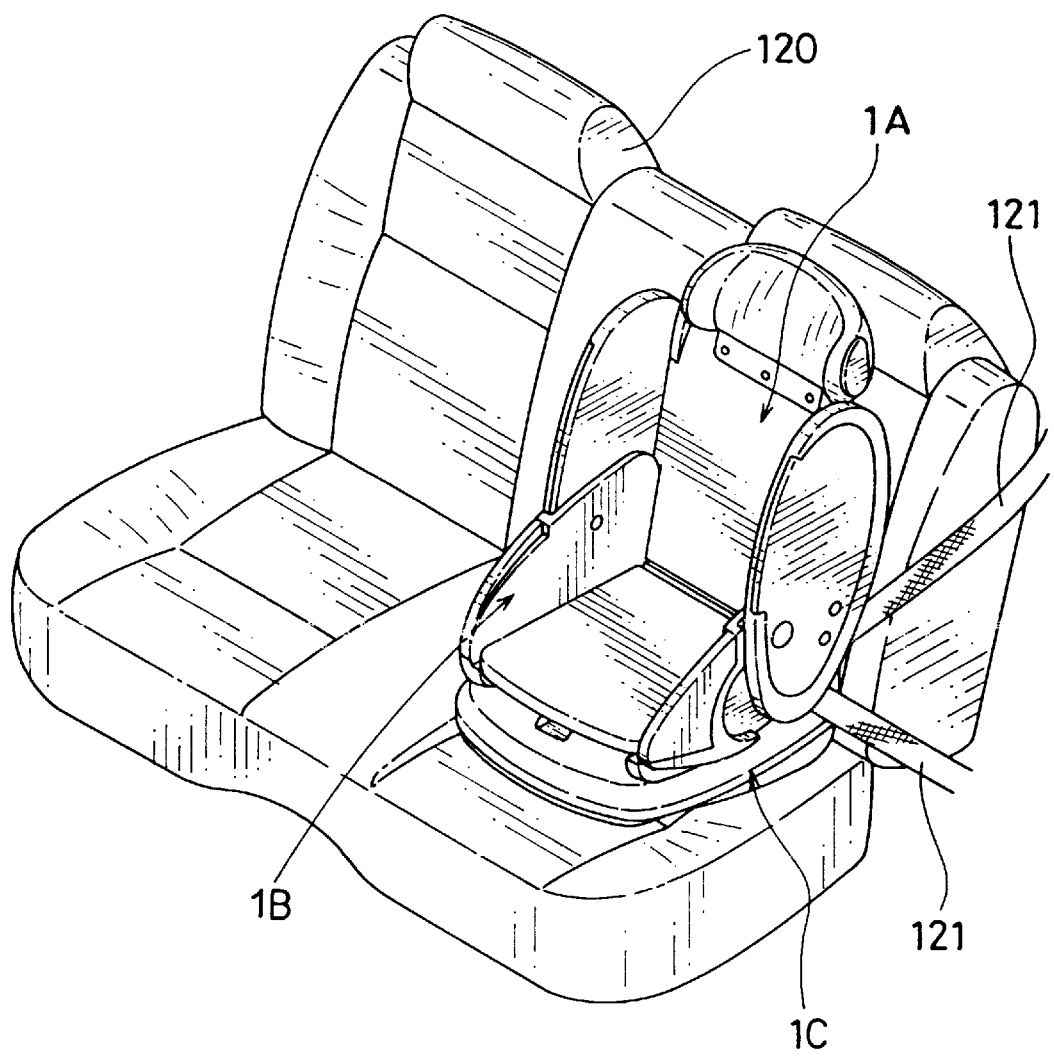

A lock device insert hole 20d for receiving a rotation lock device 50 for immobilizing the rotation of support device 1B is provided at the front side of base 1C. Support device 1B takes up a locked position by threading lock pin 51 of lock device 50 through hole 20e to engage with a lock hole 20i provided in support device 1B (refer to FIGS. 9 and 10). The details of the mechanism of rotation lock device 50 will be described below. Various use positions of child seat 1 of the above structure are shown in FIGS. 3–5. Child seat 1 is fastened to a seat 120 of a vehicle by means of a seat belt 121 with which the vehicle is equipped.

A typical mounted state is shown in FIG. 3. While base 1C is fixed to seat 120 by means of seat belt 121, support device 1B is rotated 90 degrees relative to base 1C to take up a transverse state. Backrest 11 is reclined to its full extent, whereby seat device 1A is configured in a bed state (according to weight class W1 specification). The safety of a child can be maintained with the child taking a lying posture.

Referring to FIG. 4, backrest 11 is moved in the upright direction with base 1C still immobilized. Support device 1B is rotated relative to base 1C so as to face the seat device 1A in the rearward direction. This will allow an infant of about 3 months to about 10 months that can hold his/her head firmly on his/her own to face the person such as the mother seated adjacent thereto. Also, this provides a safety seat position at the time of a crash for babies of this age. FIGS. 4 and 5 correspond to the weight class W2 specification.

FIG. 5 shows the state where support device 1B is fixed to base 1C so that the occupant faces forward. A comfortable seat is provided for infants of above 10 months.

Figure 6:
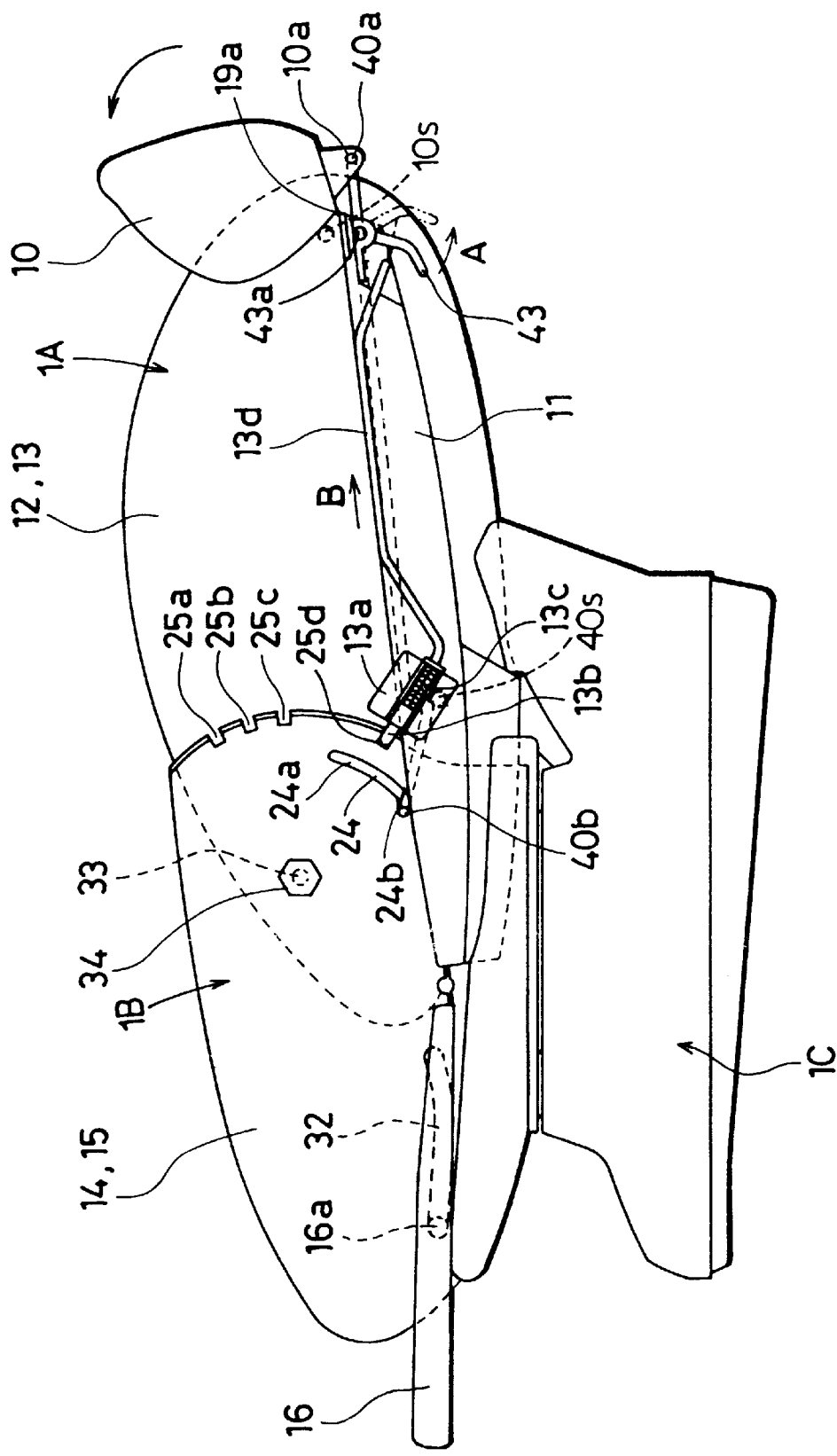
FIGS. 6–8 respectively show different positions of the reclining mechanism of the child seat according to the first embodiment of the present invention.
Figure 7:
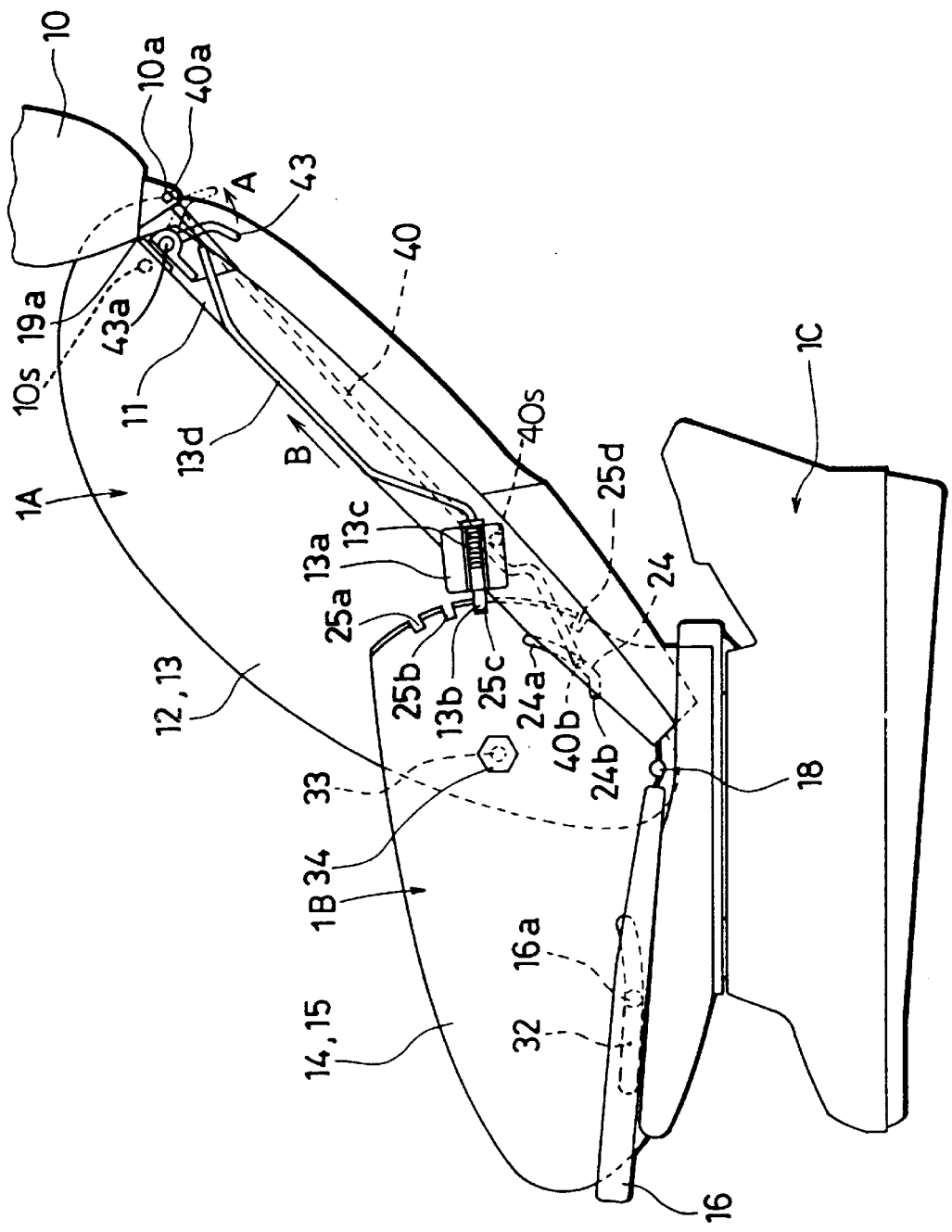
Figure 8:
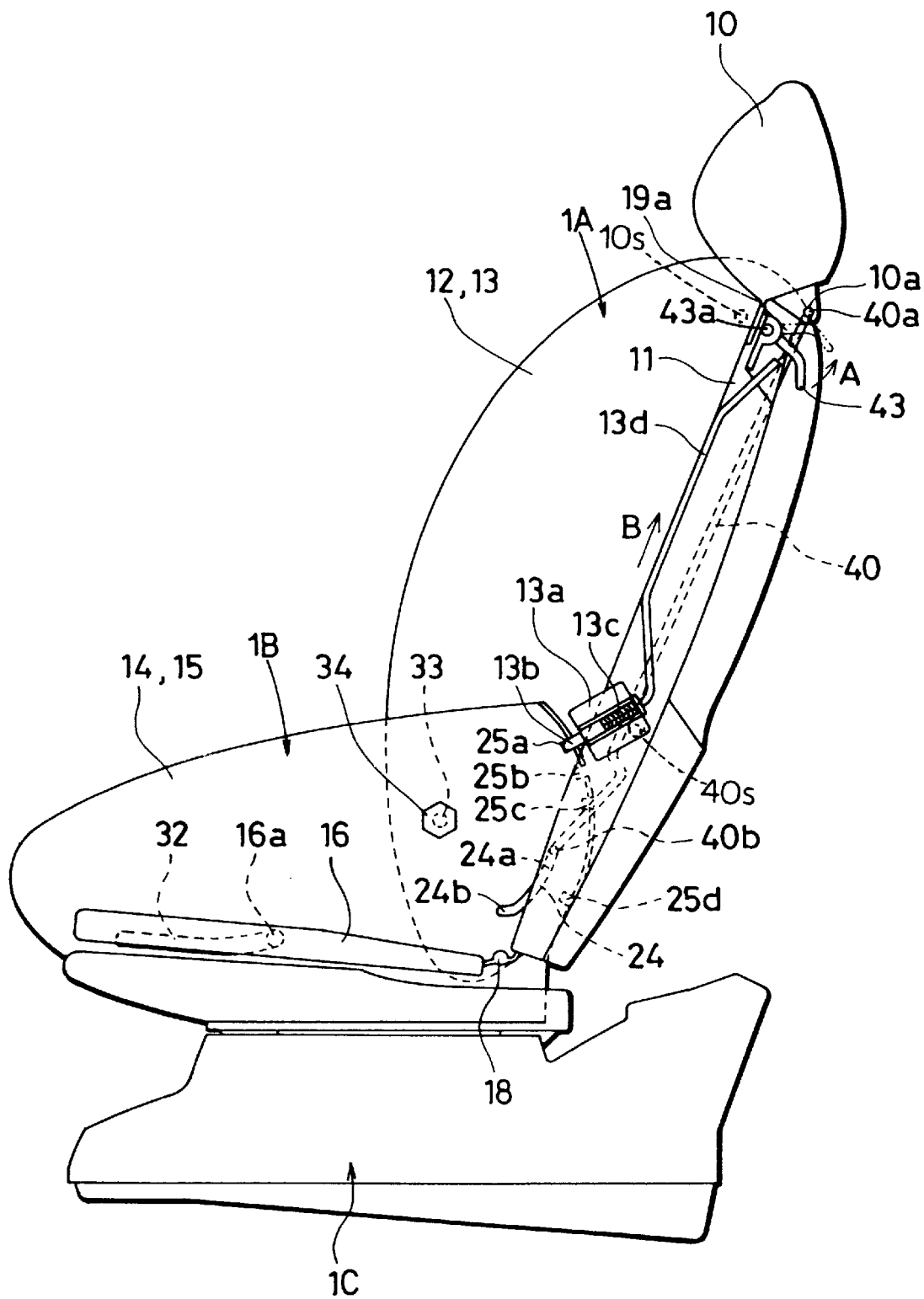

FIGS. 6–8 are diagrams for describing the reclining mechanism of seat device 1A and the movement of head guard 10 to an upright position in cooperation with the reclining mechanism.

FIG. 6 shows the state where backrest 11 is at its fullest reclined state. This forms the optimum bed plane on which a child can be laid. Engagement pin 13b fits into engagement hole 25d respectively provided in armrests 14 and 15. The lower end portion 40b of link rod 40 is located at the terminal end of first elongated aperture 24b of elongated link guide aperture 24. Therefore, lower end 40b is immobilized even when backrest 11 carries out a pivoting motion.

In comparison with the state shown in FIG. 8 where backrest 11 takes the most upright position, link rod 40 is urged upwards at the terminal end of first elongated aperture 24b. Head guard 10 pivots about hinge 19a to be oriented substantially perpendicular to backrest 11. As a result, backrest 11 is enclosed by side guards 12 and 13 and head guard 10. The safety of the child supported in the child seat can be ensured.

In the state shown in FIG. 6, if it is desired to change the reclining angle of the backrest 11, reclining lever 43 attached to-backrest 11 via a rotary axis 43a in a manner so that reclining lever 43 is rotatable in the upward and backward direction is lifted in the direction indicated by arrow A. In response, wire 13d is pulled in the direction indicated by arrow B in the drawing, whereby engagement pin 13b is pulled out of engagement with engagement hole 25a. In this state, backrest 11 is pivotable about pin bolt 34, so that backrest 11 can be moved to a more upright position as shown in FIG. 7. By releasing reclining lever 43 at this time, engagement pin 13b will be fitted into engagement hole 25c by the bias of spring 13.

At the same time, seat bottom 16 slides backward along seat guide groove 32. Lower end portion 40b of link rod 40 is located at second elongated aperture portion 24b of elongated link guide aperture 24. Head guard 10 is oriented at a non-perpendicular angle relative to back rest 11 from the state shown in FIG. 6.

To change the state shown in FIG. 7, reclining lever 43 is pulled upward to disengage pin 13b from engagement hole 25c. Backrest 11 is moved to a further upright position. Backrest 11 takes the most upright position when engagement pin 13b is fitted into engagement hole 25a. Seat bottom 16 is further moved backward along elongated seat guide aperture 32.

By providing elongated seat guide aperture 32 so as to gradually extend downward and frontward, seat bottom 16 is tilted frontward to provide a comfortable bed plane for the child.

When backrest 11 is to be reclined, the tilted angle of backrest 11 can easily be adjusted by a procedure opposite to that described with reference to FIGS. 6–8.

Stoppers 40S and 10S that are engaged at the lower ends of a bent portion 40a located midway of link rod 40 and head guard 10 are preferably provided so that head guard 10 can be pivoted smoothly and positively when backrest 11 is moved to an upright position.

The mechanism of rotation lock device 50 for immobilizing support device 1B relative to base 1C will be described hereinafter with reference to FIGS. 9 and 10.

Figure 9:
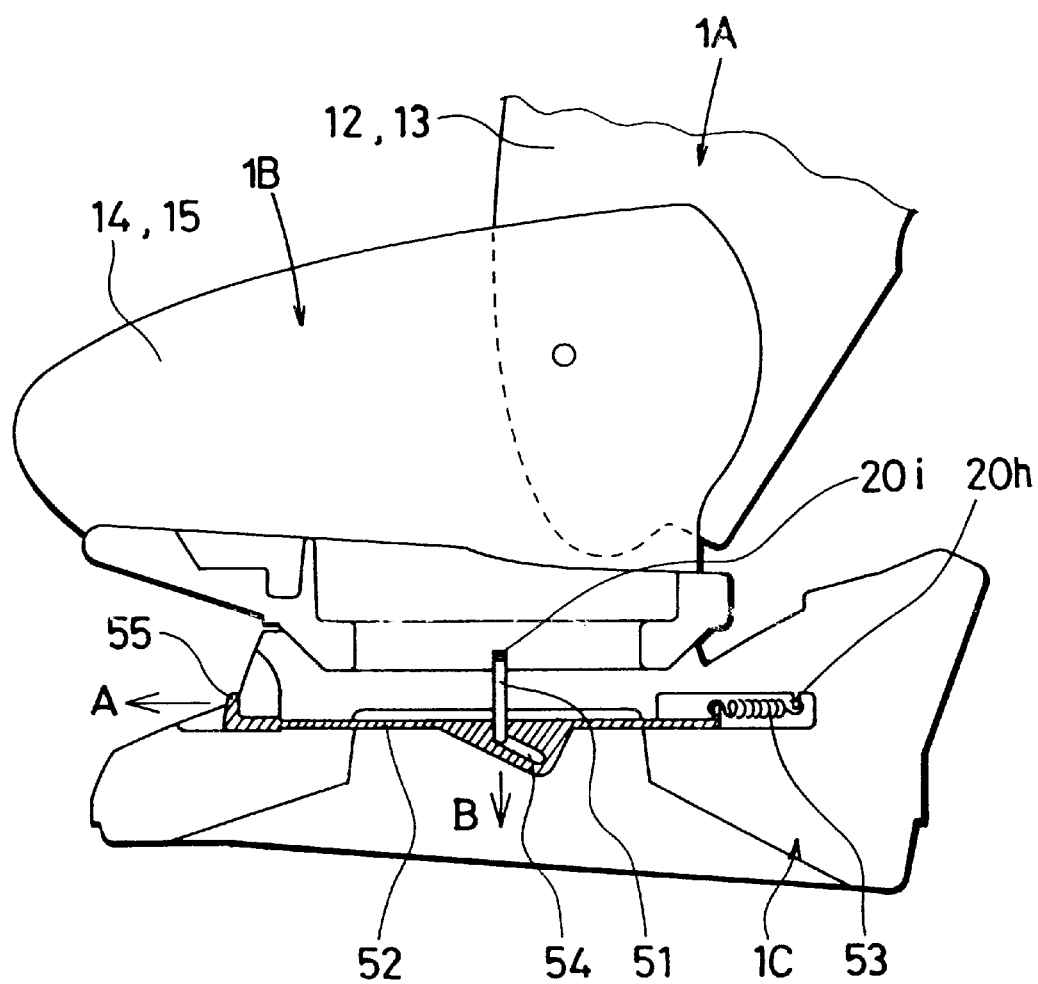
FIGS. 9–11 respectively show a rotation lock device of the child seat according to the first embodiment of the present invention.
Figure 10:
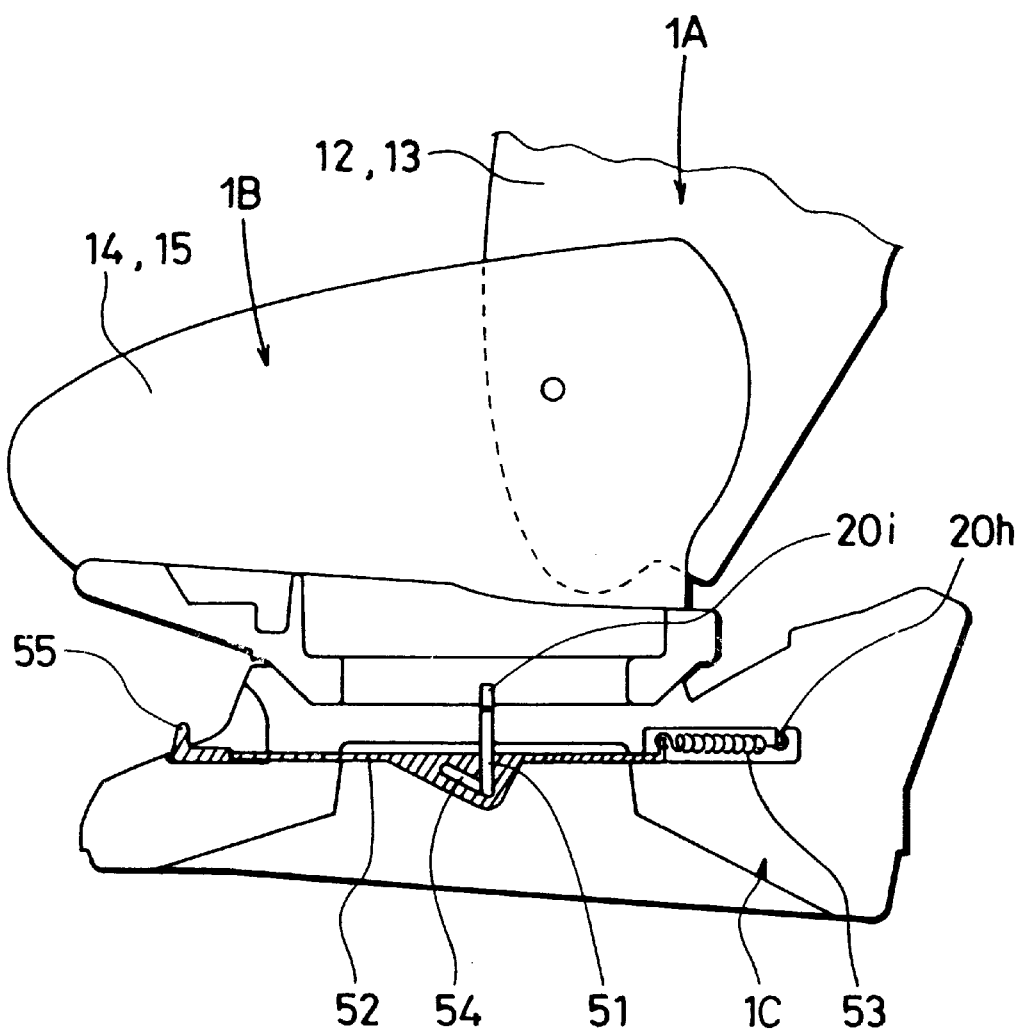

FIG. 9 shows the state in which support device 1B is fastened to base 1C. A lock pin 51 has its lower end engaged into a guide groove 54 in lock plate 52 and the upper end fitted in a lock hole 20i provided in support device 1B.

Lock plate 52 is constantly pulled in the backward direction by the bias of a spring 53 having one end engaged with the rear end of lock plate 52 and the other end anchored to an engagement portion 20h provided in base 1C. As a result, lock pin 51 is always fitted into lock hole 20i provided in support device 1.

By pulling out a pull plate 55 provided at the leading end of lock plate 52 in the direction of arrow A, lock pin 51 is shifted gradually in the direction of arrow B along guide groove 54. In response, the engagement of lock pin 51 with lock hole 20a is released as shown in FIG. 10, so that base 1C can rotate freely. In a normal state, lock pin 51 is fitted into lock hole 20i, so that rotation lock device 50 always operates to take a safety state.

The mechanism for allowing backrest 11 to be reclined when seat device 1A takes a transverse position, and for preventing backrest 11 from being reclined when seat device 1A takes a position other than the transverse position will be described hereinafter with reference to FIGS. 11–15.

Figure 11:
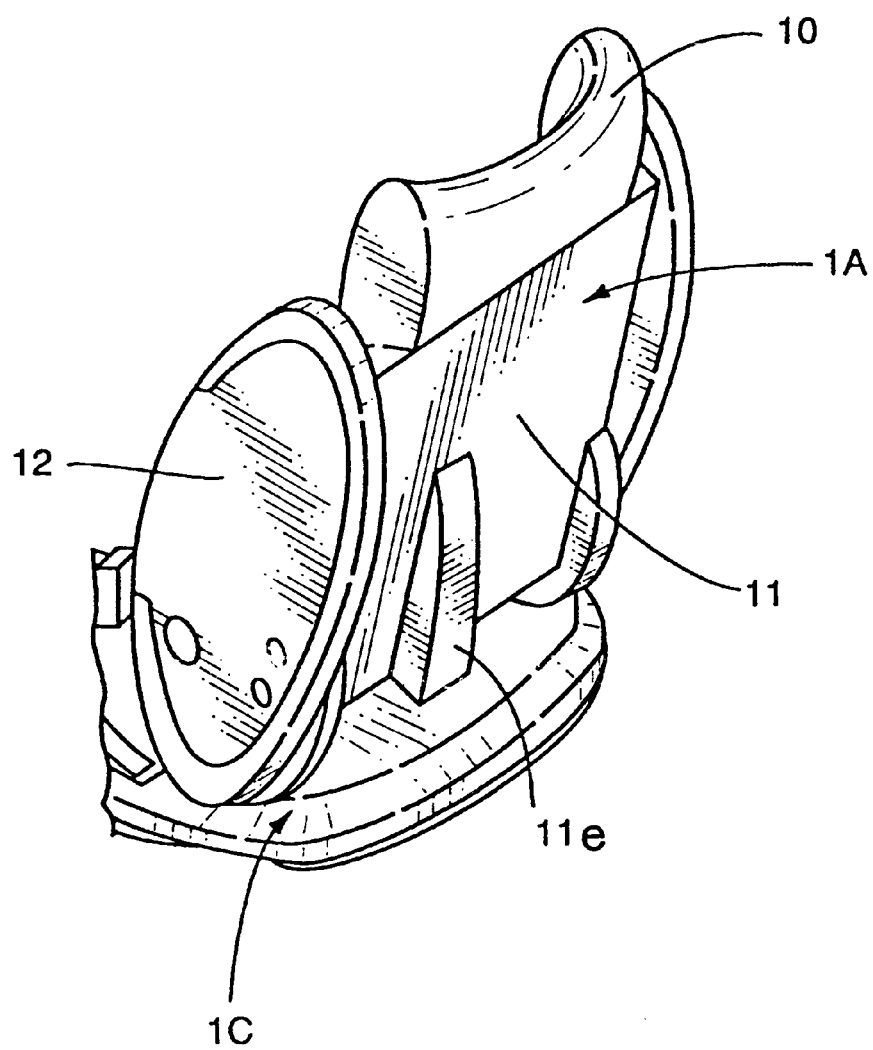

As shown in FIG. 11, an engagement projection 11e is provided in the proximity of the lower end at the backside of backrest 11. Support plate 30 (refer to FIG. 2) includes a concave groove 30c that extends transversely for receiving engagement projection 11e to allow backrest 11 to be reclined when seat device 1A takes a transverse position, and abutment faces 30a and 30b to prevent reclining of backrest 11 by abutting against engagement projection 11e when seat device 1A takes a position other than the transverse state.

Figure 12:
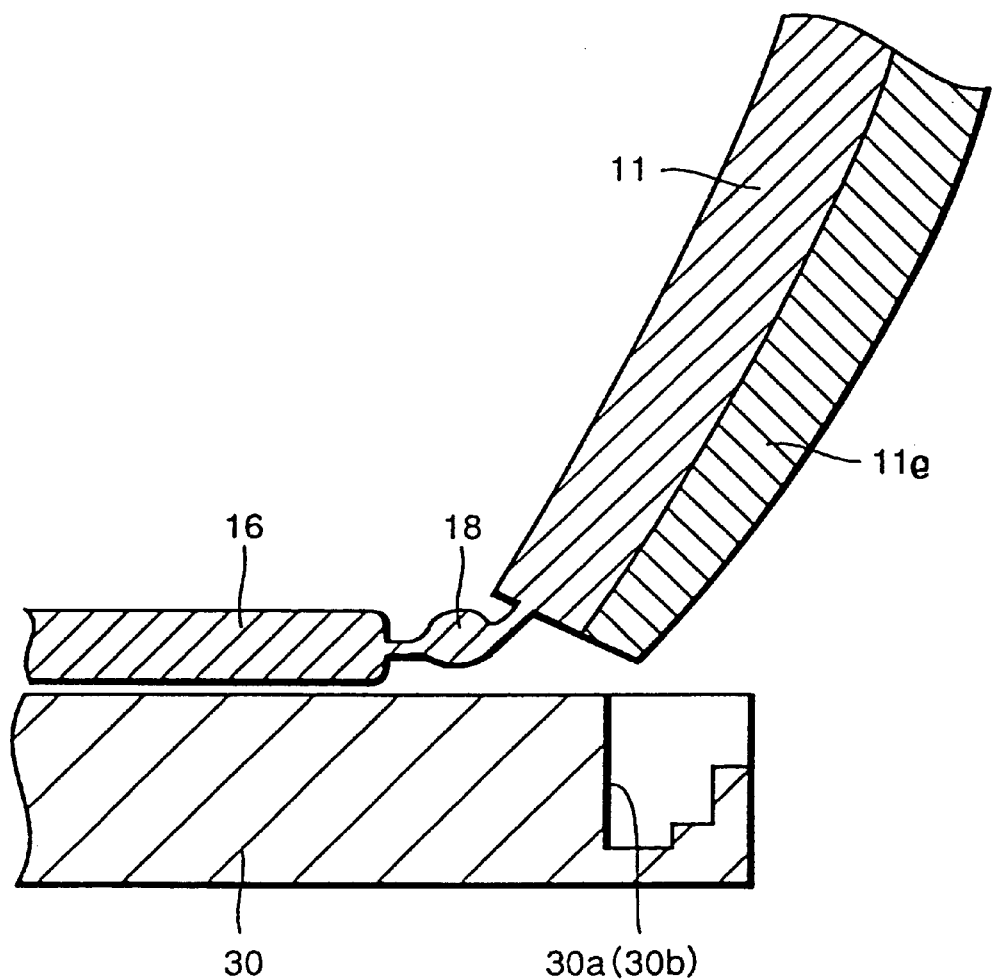
FIGS. 12–15 respectively show a mechanism to prevent reclining of the backrest of the child seat according to the first embodiment of the present invention.
Figure 13:
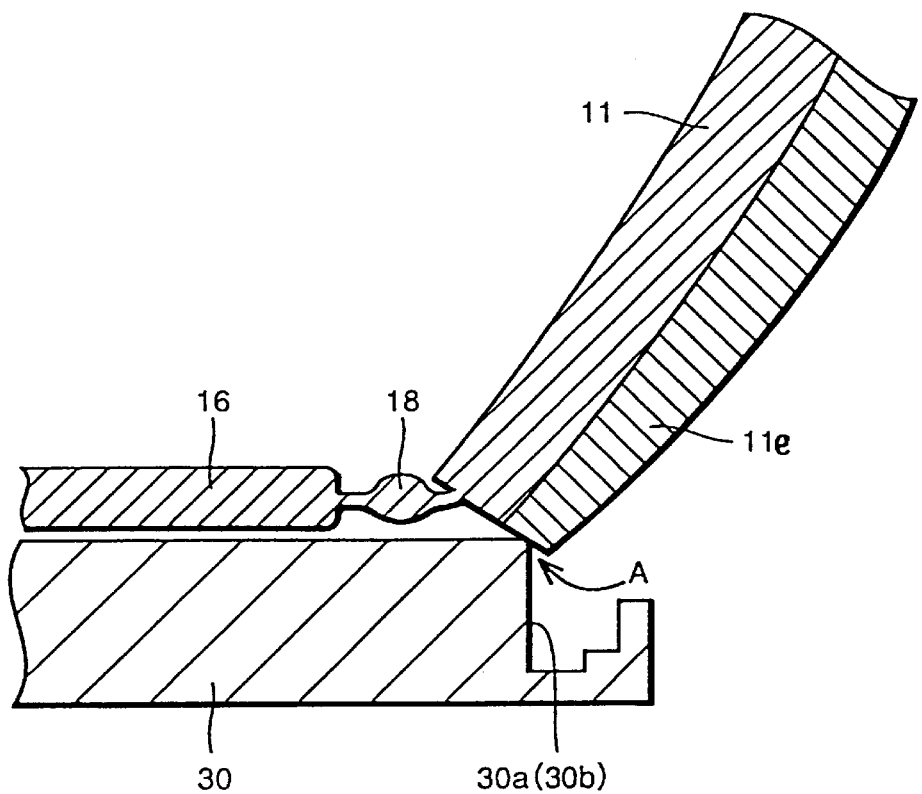

This mechanism is shown more specifically by FIGS. 12 and 13 which are enlarged partial vertical sectional views of the vicinity of the lower portion of backrest 11 when seat device 1A takes a forward facing or backward facing state. When an attempt is made to recline backrest 11 in the state shown in FIG. 12, engagement projection 11e provided at the lower end of backrest 11 abuts against abutment faces 30a or 30b at an area A shown in FIG. 13 to prevent backrest 11 from reclining.

Figure 14:
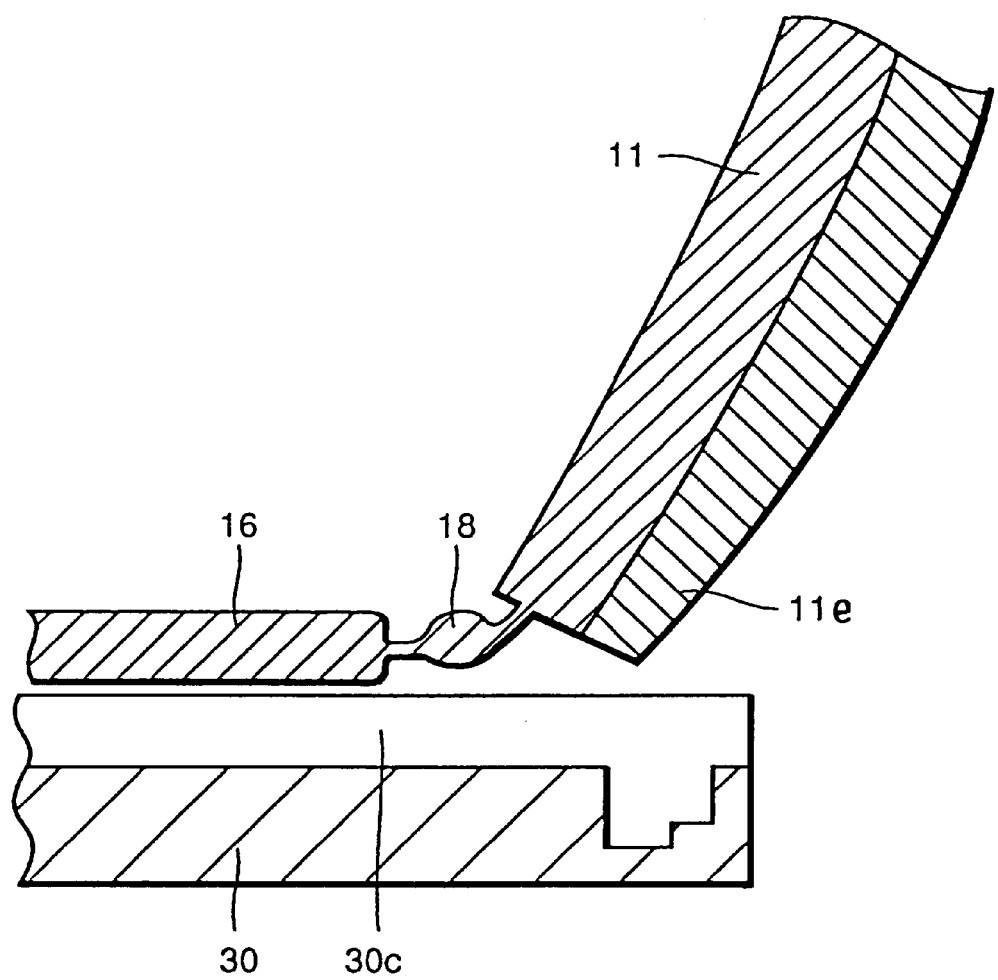
Figure 15:
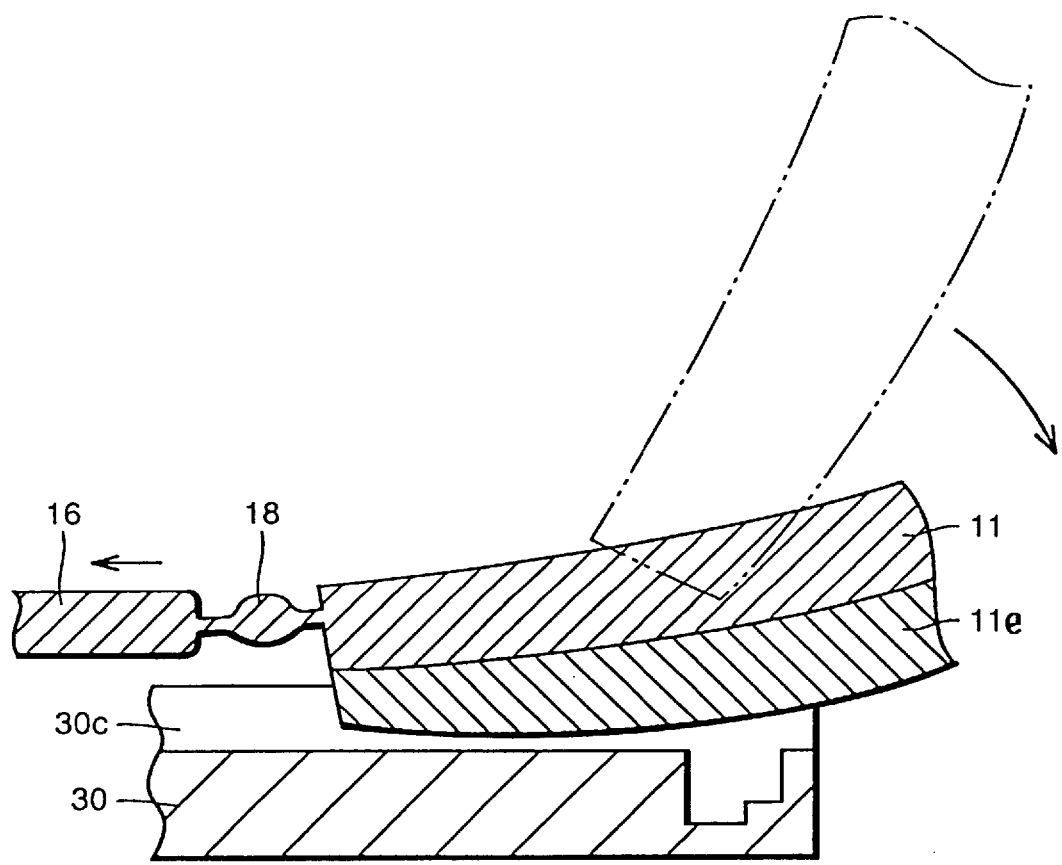

FIGS. 14 and 15 are partial enlarged vertical sectional views of the vicinity of the lower end of backrest 11 when seat device 1A is in the transverse state. As backrest 11 is reclined from the state shown in FIG. 14, engagement projection 11e provided at the lower end of backrest 11 is received in concave groove 30c to allow backrest 11 to be reclined as shown in FIG. 15. Here, engagement projection 11e also has the sidewall portion thereof substantially accommodated in recess groove 30c, whereby the rotation of seat device 1A relative to base 1C is suppressed.

This mechanism of preventing reclining of backrest 11 when in the forward facing or backward facing position provides the following advantages. When child seat 1 is used as a backward facing infant seat, the mechanism can be realized of preventing the maximum tilted angle of backrest 11, i.e. the angle between the surface of the backrest and the vertical plane, from exceeding 60 degrees taking into consideration the rebound of the vehicular child safety seat at the time of a crash. When seat device 1a is used as a bed in a transverse state, rotation of seat device 1A relative to base 1C can be suppressed to further increase the safety when used in a bed position.

Thus, child seat 1 of the present embodiment can meet the safety standards for weight classes W1 and W2 in accordance with the Japanese Industrial Standard (vehicular equipment-child protection apparatus: JIS-D 0401-1996) regulations.

Although engagement projection 11e is provided at backrest 11 and concave groove 30c and abutment faces 30a and 30b are provided at support plate 30 in the above described structure, a similar function can be implemented by providing a concave groove on backrest 11 and an engagement projection on support plate 30.

In the child seat 1 of the present embodiment, backrest 11 is connected to seat bottom 16 in a reclinable manner, and seat bottom 16 and backrest 11 can form a substantially horizontal plane for a bed when backrest 11 is at its most reclined position. When a child is laid in child seat 1 in this position, the child can be supported in the vehicle in a safe and comfortable position.

Second Embodiment

A vehicular child safety seat according to a second embodiment of the present invention will be described hereinafter with reference to the drawings.

A child seat 100 which is the vehicular child safety seat of the present embodiment has a cushion material attached to child seat 1 of the first embodiment shown in FIG. 1. Referring to FIGS. 16 and 17, child seat 100 further includes a pair of shoulder belts 114 and 115 and a pair of lumbar belts 117 and 118 to form a 5 point seat belt with crotch belt 17. The height of the pair of shoulder belts 114 and 115 can be adjusted by means of selecting an appropriate pair of adjustment apertures 125 provided at backrest 11 to allow the body of the child to be supported appropriately according to the body size of the child. In the drawings, components corresponding to those of child seat 1 of the first embodiment are denoted by the same reference characters.

FIG. 16 is a perspective view of child seat 100 in the position for use as a bed. FIG. 17 is a perspective view of child seat 100 in the position for use as a seat.

Child seat 100 further includes a pair of head guards 107 and 108 that are inclinable toward the inner side to further improve the safety protection of the side of the head of a child.

It is to be understood that the embodiments disclosed herein are only examples in all issues, and are not to be limited to the structure and operation shown. For example, the present invention is not limited to the above-described structure of the child seat 1 where support device 1B is attached to base 1C so as to be rotatable relative thereto. A structure can be adopted where support device 1B and base 1C are detachable, and the orientation of support device 1B and base 1C can be altered as necessary. Also, a structure can be adapted where support device 1B is fastened to base 1C by providing a seat belt fixation groove 20f at two locations crossing each other in base 1C.

The reclining mechanism of backrest 11 is not limited to the disclosed mechanism. For example, the reclining mechanism disclosed in Japanese Patent Laying-Open No. 7-17312, for example, or a reclining mechanism employing various other embodiments well known in the art can be adapted.

Since child seat 1 of the present invention is adapted to be used by children of all ages such as a new-born baby to children of school age, appropriate mechanisms for altering the distance between side guards 12 and 13, the distance between armrests 14 and 15, and the position of head guard 10 with respect to backrest 11 according to the body size of babies, infants, and children can be adapted to suitably fit the child.

Also, a mechanism can be adapted to increase the thickness of the pair of side guards 12, 13 and armrests 14 and 15 and also increase the overlapping area between a side guard and an armrest to further improve the safety of a small baby when used in the bed position shown in FIG. 3.

Furthermore, the child seat of the present invention can be used in a manner having seat device 1A removed and using support device 1B and base 1C for weight class W3 and covering support device 1B with a cushion member and the like. Thus, the child seat of the present invention can be used consistently in common for children corresponding to the weight class W1 specification to the weight class W3 specification.

Although not illustrated, the cushion member of FIGS. 16 and 17 can have appropriate grooves provided at the surface thereof to improve the passage of air along the area of the cushion member in contact with the child so as to improve the comfort of the child held in the child seat.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A vehicular child safety seat adapted to be secured to a seat of a vehicle and adapted to accommodate a child ranging from a newborn baby to a school age child therein, comprising a seat device including:

a seat bottom having a seat surface adapted to support the buttocks of the child thereon;

a backrest arranged to be variably reclinable relative to said seat bottom, and having a backrest surface adapted to support the back of the child thereon;

a pair of side guards extending from two opposite lateral edges of said backrest substantially perpendicularly to said backrest surface and being adapted to support or guard the sides of the child; and a head guard tiltably connected at an upper free end of said backrest away from said seat bottom, so that said head guard is tiltable at a variable angle relative to said backrest surface so as to selectively guard the top of the head of the child;

wherein said safety seat is adapted to be selectively configured into a bed configuration and a seat configuration;

in said bed configuration, said backrest is in a most reclined position so that said seat surface and said backrest surface together form a bed surface suitable for supporting the newborn baby lying thereon, said head guard is in a tilted position protruding from said backrest surface and is adapted to guard the top of the head of the newborn baby, and said side guards are adapted to support or guard the sides of the newborn baby; and in said seat configuration, said backrest is in an upright position more upright than said most reclined position, and said backrest surface and said seat surface together form a sitting surface suitable for supporting the school age child sitting thereon;

and said vehicular child safety seat further comprising:

a support device including a connection plate and a pair of armrests, wherein said armrests are respectively arranged inwardly adjacent and in close proximity to said side guards, said armrests are respectively mounted on said connection plate at lower ends of said armrests, and said armrests are respectively pivotably connected directly to said side guards at a substantially horizontal support axis passing transversely through said armrests to enable said side guards to pivot relative to said armrests about said support axis; and a base including a base member and a holding mechanism rotatably holding said support device relative to said base member so as to allow said support device to rotate relative to said base member about a substantially vertical rotation axis.

2. The vehicular child safety seat according to claim 1, further comprising removable support bolts by which said armrests are removably pivotably connected to said side guards, so that said seat device is removable from said support device, and wherein said holding mechanism detachably holds said support device so that said seat device and said support device are removable from said base.

3. The vehicular child safety seat according to claim 1, wherein said base member includes a circular convex protrusion concentric relative to said rotation axis, said connection plate of said support device has an opening that is concentric with and receives said circular convex protrusion of said base member therein, and said holding mechanism comprises a support plate that is arranged to hold said connection plate between said support plate and said base member and that is fixed to said convex protrusion of said base so as to allow said connection plate to rotate on said convex protrusion received in said opening.

4. The vehicular child safety seat according to claim 1, further comprising a first stop member that is provided on said backrest and a second stop member that is provided on said base and adapted to cooperate with said first stop member by allowing relative motion of said stop members so as to allow said backrest to recline to said reclined position when said seat device is rotated about said rotation axis into a transverse position that is transverse relative to a front-to-back direction of said base, and by respectively blocking relative motion of said stop members so as to prevent said backrest from being reclined from said upright position into said reclined position when said seat device is rotated about said rotation axis into a non-transverse position rotationally displaced from said transverse position.

5. The vehicular child safety seat according to claim 4, wherein said first stop member comprises an engagement projection protruding from a back surface of said backrest opposite said backrest surface at a lower end of said backrest, and wherein said second stop member comprises a concave groove and an abutment face provided on said holding mechanism, with said concave groove extending transversely relative to said front-to-back direction and being dimensioned and arranged so as to receive said engagement projection sliding in said groove when said backrest is reclined when said seat device is in said transverse position, and with said abutment face positioned to abut against and block movement of said engagement projection to prevent reclining of said backrest when said seat device is in said non-transverse position rotationally displaced from said transverse position.

6. The vehicular child safety seat according to claim 5, wherein said engagement projection received in said concave groove prevents rotation of said seat device relative to said base when said backrest is in said reclined position.

7. The vehicular child safety seat according to claim 1, wherein respective portions of said armrests respectively overlap said side guards, and wherein said support axis passes through said portions of said armrests overlapping said side guards.

8. The vehicular child safety seat according to claim 1, wherein said seat bottom is slidingly connected to and supported by said armrests and hingedly connected to a bottom portion of said backrest so that said seat bottom slides back relative to said armrests together with said bottom portion of said backrest as said backrest is tilted from said reclined position to said upright position.

9. The vehicular child safety seat according to claim 8, further comprising a crotch belt secured to said connection plate and extending upwardly through an elongated hole provided in said seat bottom, wherein said elongated hole is elongated in a front-to-back direction of said seat bottom parallel to said sliding of said seat bottom.

10. The vehicular child safety seat according to claim 9, further comprising a pair of shoulder belts and a pair of lumbar belts coupleable with said crotch belt to form a five point seat belt system.

11. The vehicular child safety seat according to claim 1, wherein said base further includes seat fixing means for selectively fixing a rotation position of said seat device relative to said base about said rotation axis.

12. The vehicular child safety seat according to claim 1, further including a linkage that links said head guard to at least one of said armrests, and that is so arranged as to tiltingly move said head guard relative to said backrest as said backrest is reclined relative to said armrests such that said head guard is in a most tilted position protruding substantially perpendicularly relative to said backrest surface when said backrest is in said most reclined position.

13. The vehicular child safety seat according to claim 12, wherein said at least one armrest has an elongated guide aperture therein, wherein said linkage includes a connection rod having a first end pivotably connected to said head guard proximate a lower end of said head guard and a second end received slidably and pivotably in said elongated guide aperture, and wherein said elongated guide aperture includes a first elongated aperture portion configured to gradually approach said support axis so that said second end of said connection rod is guidingly received in said first elongated aperture portion so as to move said head guard into said most tilted position when said backrest is moved into said most reclined position, and a second elongated aperture portion that continuously adjoins said first elongated aperture portion and that is elongated along a circular arc concentric about said support axis so that said second end of said connection rod is guidingly received in said second elongated aperture portion so as to gradually move said head guard into a least tilted position substantially coplanar with said backrest when said backrest is moved into said upright position.

14. The vehicular child safety seat according to claim 1, wherein said seat device further comprises a reclining mechanism for selectively altering a recline angle of said backrest relative to said seat bottom between said most reclined position when said safety seat is in said bed configuration and said upright position, which is a most upright position, when said safety seat is in said seat configuration.

15. The vehicular child safety seat according to claim 1, wherein said head guard is connected by a hinge to an upper edge of said backrest along said upper free end of said backrest, wherein said hinge forms a substantially horizontal tilting axis about which said head guard is tiltable relative to said backrest.

16. The vehicular child safety seat according to claim 1, being adapted to accommodate a child having a body weight throughout a range from under 10 kg to 25 kg.

17. A combination of a vehicular child safety seat as claimed in claim 1 and a vehicle, wherein a safety seat is secured to a seat of said vehicle, wherein said safety seat is arranged in said vehicle with a longitudinal direction of said bed surface oriented transverse relative to a longitudinal axis of said vehicle when said safety seat is configured in said bed configuration, and wherein said safety seat is arranged in said vehicle with said backrest surface facing substantially forward or backward along said longitudinal axis of said vehicle when said safety seat is configured in said seat configuration.

18. A vehicular child safety seat adapted to be secured to a seat of a vehicle and adapted to accommodate a child ranging from a newborn baby to a school age child therein, comprising a seat device including:

a seat bottom having a seat surface adapted to support the buttocks of the child thereon;

a backrest arranged to be variably reclinable relative to said seat bottom, and having a backrest surface adapted to support the back of the child thereon;

a pair of side guards extending from two opposite lateral edges of said backrest substantially perpendicularly to said backrest surface and being adapted to support or guard the sides of the child; and a head guard tiltably connected at an upper free end of said backrest away from said seat bottom, so that said head guard is tiltable at a variable angle relative to said backrest surface as to selectively guard the top of the head of the child;

wherein said safety seat is adapted to be selectively configured into a bed configuration and a seat configuration;

in said bed configuration, said backrest is in a most reclined position so that said seat surface and said backrest surface together form a bed surface suitable for supporting the newborn baby lying thereon, said head guard is in a tilted position protruding from said backrest surface and is adapted to guard the top of the head of the newborn baby, and said side guards are adapted to support or guard the sides of the newborn baby; and in said seat configuration, said backrest is in an upright position more upright than said most reclined position, and said backrest surface and said seat surface together form a sitting surface suitable for supporting the school age child sitting thereon;

wherein said seat device further comprises a reclining mechanism for selectively altering a recline angle of said backrest relative to said seat bottom between said most reclined position when said safety seat is in said bed configuration and said upright position, which is a most upright position, when said safety seat is in said seat configuration;

wherein said child safety seat further comprises at least one armrest respectively arranged adjacent to a respective one of said side guards, wherein said reclining mechanism includes at least two engagement holes in said armrest, an engagement pin arranged on an inner side of at least one of said side guards and adapted to be selectively insertable into said engagement holes, a resilient member connected to said engagement pin so as to bias said engagement pin to be inserted into a selected one of said engagement holes, and a release handle arranged on a back side of said backrest opposite said backrest surface and connected to said engagement pin so that said release handle can selectively counteract said bias of said resilient member and release said engagement pin from said engagement holes.

19. A combination including a vehicle comprising a vehicle body, a vehicle seat, and a seat belt, and a vehicular child safety seat secured to said vehicle seat in said vehicle by said seat belt, said safety seat being adapted to accommodate a child ranging from a newborn baby to a school age child therein, and comprising a seat device including:

a seat bottom having a seat surface adapted to support the buttocks of the child thereon;

a backrest arranged to be variably reclinable relative to said seat bottom, and having a backrest surface adapted to support the back of the child thereon;

a pair of side guards extending from two opposite lateral edges of said backrest substantially perpendicularly to said backrest surface and being adapted to support or guard the sides of the child; and a head guard tiltably connected at an upper free end of said backrest directed away from said seat bottom, wherein said head guard is tiltable at a variable angle relative to said backrest surface so as to selectively guard the top of the head of the child;

wherein said safety seat is adapted to be selectively configured into a bed configuration and a seat configuration;

in said bed configuration, said backrest is in a most reclined position so that said seat surface and said backrest surface together form a bed surface suitable for supporting the newborn baby lying thereon, said head guard is in a tilted position protruding from said backrest surface and is adapted to guard the top of the head of the newborn baby, and said side guards are adapted to support or guard the sides of the newborn baby, while the backrest extends along a transverse direction perpendicular to a travelling axis of said vehicle; and in said seat configuration, said backrest is in an upright position more upright than said most reclined position, and said backrest surface and said seat surface together form a sitting surface suitable for supporting the school age child sitting thereon, while said backrest surface faces forward or backward along said travelling axis of said vehicle;

wherein said seat device further comprises a reclining mechanism for selectively altering a recline angle of said backrest relative to said seat bottom between said most reclined position when said safety seat is in said bed configuration and said upright position, which is a most upright position, when said safety seat is in said seat configuration;

further comprising at least one armrest respectively arranged adjacent a respective one of said side guards;

wherein said reclining mechanism includes at least two engagement holes in said armrest, an engagement pin arranged on an inner side of at least one of said side guards and adapted to be selectively insertable into said engagement holes, a resilient member connected to said engagement pin so as to bias said engagement pin to be inserted into a selected one of said engagement holes, and a release handle arranged on a back side of said backrest opposite said backrest surface and connected to said engagement pin so that said release handle can selectively counteract said bias of said resilient member and release said engagement pin from said engagement holes.

* * * * *